No. 794,239. PATENTED JULY 11, 1905.
J. I. MAGUIRE.
COMBINED DUST, WATER, AND MUD GUARD.
APPLICATION FILED MAR. 2, 1905.
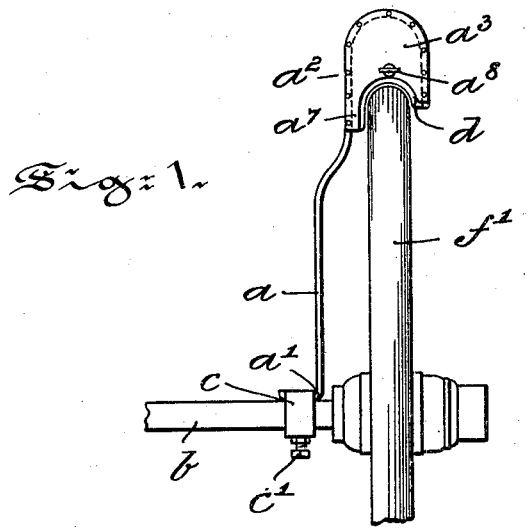
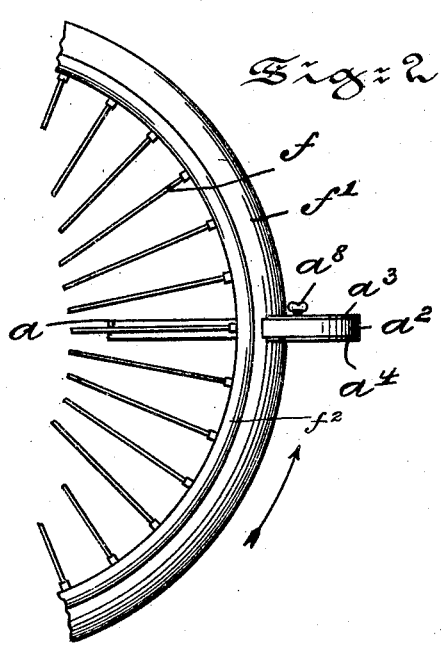
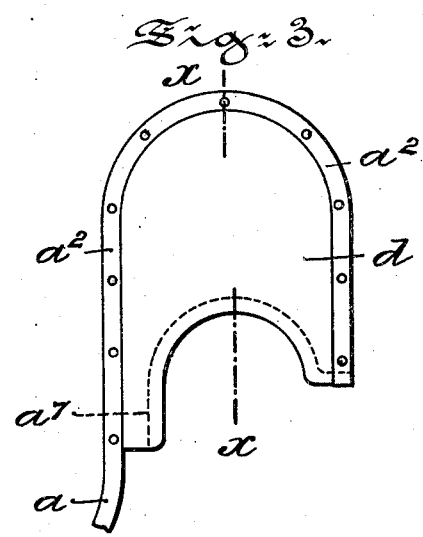
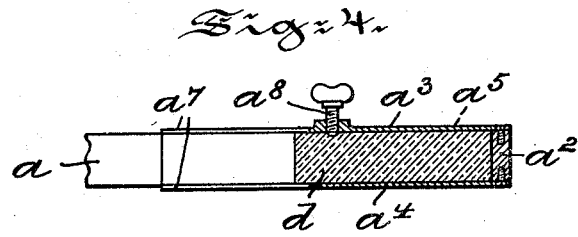
Witnesses:
Wilhelm Vogt
Thomas M. Smith
Inventor:
John I. Maguire
By J. Walter Douglas
Attorney No. 794,239. Patented July 11, 1905.

UNITED STATES PATENT OFFICE.

JOHN I. MAGUIRE, OF WAYNE, PENNSYLVANIA.

COMBINED DUST, WATER, AND MUD GUARD.

SPECIFICATION forming part of Letters Patent No. 794,239, dated July 11, 1905.

Application filed March 2, 1905. Serial No. 248,162.

*To all whom it may concern:*

Be it known that I, JOHN I. MAGUIRE, a citizen of the United States, residing at Wayne, in the county of Delaware and State of Pennsylvania, have invented certain new and useful Improvements in a Combined Dust, Water, and Mud Guard, of which the following is a specification.

My invention relates to a device for catching dust, water, mud, or other extraneous matter and preventing splashing of the same against or into the vehicle or wagon; and in such connection it relates more particularly to the construction and arrangement of the dust, water, and mud guard.

The principal object of my invention is to provide a combined dust, water, and mud guard so constructed and arranged as to provide a support for an adjustable member and of means for holding the same in proper position with respect to the tire of the vehicle-wheel, so as to always permit of compensating for wear of the movable member.

The nature and characteristic features of said guard will be more fully understood from the following description, taken in connection with the accompanying drawings, forming part hereof, in which—

Figure 1 is a top or plan view of the guard in application to an axle of the vehicle, the said view illustrating the operative position of the guard contiguous to the tire of the vehicle-wheel. Fig. 2 is a side elevational view of a guard and a portion of the wheel. Fig. 3 is a top or plan view, enlarged, of the guard with the top plate thereof removed and of the bracket for carrying and connecting the same with the axle of a vehicle; and Fig. 4 is a cross-sectional view on the line $x\,x$ of Fig. 3.

Referring to the drawings, $a$ represents a bracket, preferably formed of a bar bent at a right angle at one end, as at $a'$, and at the opposite end terminating in a semicircular portion $a^2$. The right-angular portion $a'$ in the present instance, as shown, is connected with the axle $b$ of a vehicle by means of a clip $c$, provided with a tightening-bolt $c'$. However, it should be borne in mind that this bracket $a$ may be connected and supported from any other fixed portion of the vehicle, (not shown,) for instance, when the guard is applied to a vehicle in which the axle rotates.

To the top and bottom of the semicircular part $a^2$ of the bracket $a$ are provided cover-plates $a^3$ and $a^4$, forming in conjunction with said bracket a pocket or housing $a^5$ for a rubber or other suitable pad $d$. As shown in Figs. 1 and 2, the pocket or housing $a^5$ so formed and the pad $d$ are held by said bracket $a$ adjacent to the tire $f'$ of a wheel $f$ and preferably at the horizontal axis of the wheel. In order to surround the free portion of the tire, the cover-plates $a^3$ and $a^4$ and the pad $d$ at the end contiguous to the tire $f'$ of the wheel $f$ are arranged semicircular in shape and with a straight extension $a^7$, as shown in Figs. 1 and 3. Preferably the upper cover-plate $a^3$ is provided with a tightening-bolt $a^8$, which by engaging the pad $d$ holds the same in proper operative position within the holder, as shown in Fig. 4. When the wheel is rotated in the direction indicated by the arrow in Fig. 2, dust, water, or other extraneous matter raised by the tire $f'$ of the wheel $f$ will be caught by the guard and prevented from being carried by the wheel beyond the guard. The extension $a^7$ of the guard, as arranged adjacent to the inner surface of the rim $f^2$ of the wheel, effectually prevents dust, water, or other matter being thrown against or onto the body of the vehicle. If mud or other sticky matter adheres to the tire $f'$ of the wheel $f$ and is raised by the same, the adjustable pad $d$ in the holder of the guard will scrape or remove the same from both the tire and the side of the rim $f^2$ of the wheel $f$ contiguous to the body of a vehicle, and thus effectually prevent such matter being thrown upon or against the vehicle-body. The pad $d$, while held close to the tire $f'$ and the inner side of the rim $f^2$ of the wheel $f$, does not interfere with the free rotation of the wheel. When, however, mud or other sticky matter is raised by the wheel, a small portion is apt to be forced between the tire and pad, and thus produce wear of the pad. In order to compensate for such wear, the tightening-bolt $a^8$ is actuated to permit of the shifting of the pad toward the wheel, and thus to take up such wear and to maintain the pad $d$ in the position given.

Although the guard is comparatively small in size, yet its position is such that dust, water, or mud is caught a short distance above the ground and before such matter acquires any considerable momentum, so that the other portions of the vehicle are fully protected from being disfigured or soiled by such matter.

Having thus described the nature and object of my invention, what I claim as new, and desire to secure by Letters Patent, is—

A combined dust, water and mud guard, consisting of a pad having a wearing-face arranged substantially in the cross-sectional outline of the tire of the wheel and having at one side an extension projecting beyond the tire and terminating with the rim of the wheel, a bracket having cover-plates forming combined a housing adapted to receive the pad, the free ends of the cover-plates being shaped in the outline of the wearing-face of the pad and terminating adjacent to the same to permit of the free action of the projecting portion of the pad in the removal of extraneous matter from the tire and one side of the rim of the wheel, and means carried by one of said cover-plates adapted to permit of the adjustment of the pad with respect to the tire of the wheel.

In testimony whereof I have hereunto set my signature in the presence of two subscribing witnesses.

JOHN I. MAGUIRE.

Witnesses:
J. WALTER DOUGLASS,
THOMAS M. SMITH.